United States Patent
Pratt

(10) Patent No.: US 6,286,880 B1
(45) Date of Patent: Sep. 11, 2001

(54) BAILER HAVING LEAK-INHIBITING CUSHIONED SEAL

(76) Inventor: David W. Pratt, 13512 Feather Sound Cir. West Apt. #1401, Clearwater, FL (US) 33762

(*) Notice: Subject to any disclaimer, the term of this patent is extended or adjusted under 35 U.S.C. 154(b) by 0 days.

(21) Appl. No.: 09/513,384

(22) Filed: Feb. 25, 2000

Related U.S. Application Data

(63) Continuation-in-part of application No. 09/313,799, filed on May 18, 1999, now Pat. No. 6,135,523.

(51) Int. Cl.[7] .............................. F16K 3/00; F16K 15/06
(52) U.S. Cl. ............................ 294/68.25; 73/864.63; 137/533.21; 251/333; 251/368
(58) Field of Search ................. 294/68.22, 68.25; 73/864.63, 864.65, 864.66; 137/238, 244, 533.17, 533.19, 533.21, 904; 251/333, 334, 357, 358, 368, 85

(56) References Cited

U.S. PATENT DOCUMENTS

| | | | | |
|---|---|---|---|---|
| 922,986 | * | 5/1909 | Westaway | 137/533.21 |
| 1,055,385 | * | 3/1913 | Cahill | 294/68.25 |
| 1,210,487 | * | 1/1917 | Kaul | 73/864.63 |
| 1,577,809 | * | 3/1926 | Gilbreath | 294/68.22 |
| 1,963,684 | * | 6/1934 | Shimer | 137/904 |
| 2,025,296 | * | 12/1935 | McIntyre | 137/533.17 |
| 2,223,936 | * | 12/1940 | Hart | 294/68.25 |
| 2,593,830 | * | 4/1952 | Baker | 294/68.25 |
| 2,678,563 | * | 5/1954 | Parrish | 73/864.65 |
| 3,796,238 | * | 3/1974 | Roth | 294/68.25 |
| 3,995,658 | * | 12/1976 | Hager | 137/543 |
| 5,249,600 | * | 10/1993 | Blume | 251/334 |

* cited by examiner

Primary Examiner—Dean J. Kramer
(74) Attorney, Agent, or Firm—Ronald E. Smith; Smith & Hopen, P.A.

(57) ABSTRACT

A bailer that is substantially leak-free includes an improved valve assembly at its lowermost end. In a first embodiment, a valve body in the form of a hemispherical ball is mounted at the lowermost end of a straight valve stem. The hemispherical ball seats in a valve seat that matches the contour of the hemispherical exterior surface of the ball. In a second embodiment, the valve body and the matching valve seat are both frusto-conical in configuration. In a third embodiment, the valve body and matching valve seat are tapered downwardly to form an elongate, narrow slot. A fourth embodiment adds a guide member to the third embodiment structure to ensure seating of the downwardly tapering valve body in its valve seat. In all embodiments, the valve stem is slideably received within and guided by a central bore formed in a support member that spans the hollow interior of the lowermost end of the bailer, and the valve body is covered with a cushioned material of uniform thickness. The cushioned material is deformed by particulate matter but seals around such matter so that leak-free seating of the valve body against the valve seat is achieved even when particulate matter is disposed between the valve body and the valve seat. Moreover, the flexibility and resilience of the cushioned material enables it to seal valve bodies and valve seats that are out-of-round or otherwise outside of manufacturing tolerances.

2 Claims, 4 Drawing Sheets

BAILER HAVING LEAK-INHIBITING CUSHIONED SEAL

CROSS-REFERENCE TO RELATED APPLICATIONS

This disclosure is a continuation-in-part of application Ser. No. 09/313,799, filed May 18, 1999, now U.S. Pat. No. 6,135,523 by the same inventor, entitled "Bailer Having Leak-Inhibiting Seal."

BACKGROUND OF THE INVENTION

1. Field of the Invention

This invention relates, generally, to bailers. More particularly, it relates to a bailer that has a cushioned valve assembly at its lowermost end that seals effectively against leakage when seated.

2. Description of the Prior Art

Bailers are elongate cylindrical tubes that are lowered into containers for liquid fluids, bodies of water, and the like for the purpose of taking a sample of the liquid fluid so that laboratory tests can be performed thereon.

In the industry standard bailer, a free-floating ball valve at the lower end of the bailer unseats from its valve seat when the bailer is lowered into a liquid fluid, i.e., as liquid fluid flows upwardly into the hollow interior of the bailer. The ball valve travels downwardly into seating relation to its valve seat when the bailer is lifted upwardly from the liquid fluid. When properly seated, the ball valve should substantially prevent leakage of the liquid fluid from the hollow interior of the bailer.

In practice, however, the ball valve sometimes leaks profusely. The clothing of the person carrying the bailer to a vehicle that will transport the collected sample to a lab often gets wet as the liquid fluid within the bailer leaks past the ball valve. If the liquid fluid is an acid or other irritant, the leakage is more than a mere nuisance. Even if the liquid fluid is just water, the loss of sample is undesireable.

The seat for the ball valve is an annular step formed on an interior surface of a frusto-conical wall that defines the lowermost end of the bailer. A single grain of sand on the annular step can defeat proper seating of the ball valve. Sand and other particulate matter are commonly found in the liquid fluids that are collected by bailers in the field.

Moreover, leakage can occur due to manufacturing imperfections that cause the seating to be less than perfect, even when no particulate matter is present.

An improved bailer, disclosed in the above cross-referenced application, includes a valve seat in the form of an annular concavity formed in an interior surface of the frusto-conical sidewalls. The annular concavity is configured to substantially match an exterior surface of the hemispherical valve body so that substantially no leakage of liquid fluid from the hollow interior of the bailer occurs when the hemispherical valve body is seated against the annular concavity. However, if sand or other particulate matter comes to rest atop the annular concavity, leakage can still result because a single grain of sand can prevent proper seating of the hemispherical ball.

Moreover, manufacturing imperfections in the size and shape of the valve body and its mating valve seat, such as an out-of-round valve body or seat, can cause leakage even where no particulate matter is present in the sample.

The above-mentioned related application also discloses an embodiment where an annular groove of predetermined depth is formed in the interior surface of the frusto-conical sidewalls in an effort to overcome the problems caused by granular material such as sand. The annular groove is in open communication with the annular concavity and is adapted to accommodate at least one grain of a particulate matter so that the at least one grain of particulate matter does not interfere with seating of the hemispherical valve body against the annular concavity.

The formation of the grain-accommodating annular groove in the annular concavity substantially reduces leakage vis a vis the bailers of the prior art, but the manufacturing of the groove adds time and expense to the bailer manufacturing process.

Another drawback of the design disclosed in the related application is that the valve body and valve seat must be manufactured in accordance with relatively strict manufacturing tolerances if the desired seal is to be achieved. If the valve body or valve seat is out-of-round or otherwise malformed, the sealing effectiveness of the design is impaired.

What is needed, then, is an improved valve assembly at the lowermost end of a bailer. The improved valve assembly would not be defeated by a single grain of sand and would not be rendered ineffective by even relatively large amounts of sand. Moreover, it would eliminate the sand-accommodating groove formed in the valve seat. An improved design would also lower the manufacturing tolerance requirements for the valve body and valve seat so that out-of-round or other structural inadequacies could be accommodated without substantial loss in sealing effectiveness.

It was not obvious to those of ordinary skill in this art how an improved, groove-free leak-inhibiting valve for a bailer could be provided, in view of the art considered as a whole at the time the present invention was made.

SUMMARY OF THE INVENTION

The long-standing but heretofore unfulfilled need for an innovation that overcomes the limitations of the prior art is now met by a new, useful, and non-obvious invention. The present invention includes a substantially leak-free valve assembly for admitting liquid fluid into the hollow interior of a bailer as the bailer is lowered into a liquid fluid and for retaining liquid fluid within the hollow interior when the bailer is lifted from the liquid fluid.

The bailer is of the type that has a cylindrical main body, frusto-conical sidewalls at the lowermost end of the main body, and a cylindrical downspout at the lowermost end of the frusto-conical sidewalls.

A support means in the form of a spider member spans a hollow interior of the bailer near its lowermost end. A central bore is formed in the spider and has an axis of symmetry that is substantially coincident with a longitudinal axis of symmetry of the bailer.

In a first embodiment, a hemispherical-in-configuration valve body is secured to a lowermost end of a straight valve stem. The valve stem is slideably received within the central bore formed in the spider so that the hemispherical valve body rises and falls as liquid fluid flows into and out of the hollow interior of the bailer, respectively. The valve stem and the central bore cooperate to maintain the hemispherical valve body in substantial coincidence with the longitudinal axis of symmetry of the bailer as the hemispherical valve body rises and falls.

A valve seat in the form of an annular concavity is formed in an interior surface of the frusto-conical sidewalls. It is configured to substantially match an exterior surface of the hemispherical valve body so that substantially no leakage of liquid fluid from the hollow interior of the bailer occurs when the hemispherical valve body is perfectly seated against the annular concavity.

To enable substantially perfect seating of the valve body against the valve seat even when sand or other granular or particulate matter is positioned between the hemispherical valve body and the valve seat and even where no sand-accommodating groove is formed in said valve seat, and even where the size and shape of the valve body, or the valve seat, or both are outside of manufacturing tolerances, the hemispherical valve body is covered by a layer of predetermined thickness of cushioned material that is soft, flexible and resilient. The cushioned material, if it encounters one or more particles of sand or other granular or particulate matter, is locally deformed by such matter. It seals around each particle or group of particles due to its flexibility. In other words, any particle that abuts the cushioned material will form a dimple or depression in the cushioned material, but the peripheral edges of the dimple or depression will seal around such particle. This sealing prevents leakage of liquid fluid from the bailer. The cushioned material returns to its undeformed shape, due to its resilience, after the liquid fluid has been drained from the bailer.

Moreover, the cushioned material conforms to the shape and size of the valve body or valve seat to provide a substantially leak-free seal therebetween, even if either or both of said parts are out-of-round or otherwise imperfectly manufactured.

In a second embodiment, the valve body and its matching valve seat are frusto-conical in configuration, and the frusto-conical valve body is covered by a layer of the same cushioning material for the same reasons.

In a third embodiment, the valve body and its matching valve seat are downwardly tapered to form an elongate, narrow configuration and the downspout of the bailer forms an elongate, narrow slot. Again, the valve body is covered by a layer of the cushioned material.

A fourth embodiment adds to the third embodiment a resilient guide member that depends from the elongate, narrow valve body and which slides within a groove formed in the interior sidewalls of the downspout. The guide member prevents the elongate, narrow valve body from jamming.

It is a primary object of this invention to advance the art of bailers by providing a bailer that is substantially leak-free.

A more specific object is to provide an improved valve structure for bailers.

Another major object is to provide a valve assembly that is not defeated by particulate matter that may be present in the liquid fluid collected by the bailer and which is not dependent upon the formation of a groove in the valve seat to accommodate particulate matter.

Still another important object is to provide a construction that accommodates an out-of-round valve body, valve seat, or both, without substantial loss of sealing capability.

These and other important objects, features, and advantages of the invention will become apparent as this description proceeds.

The invention accordingly comprises the features of construction, combination of elements and arrangement of parts that will be exemplified in the construction hereinafter set forth, and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
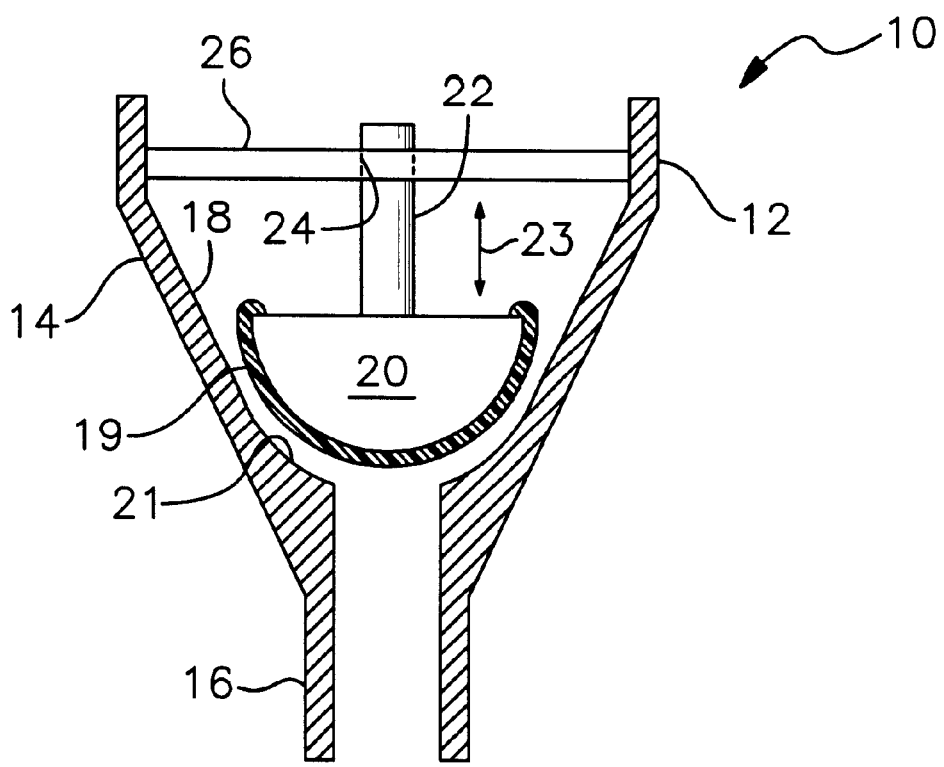
FIG. 1 is a side elevational, sectional view of a first embodiment of an improved valve means for a bailer.

Referring now to FIG. 1, it will there be seen that an exemplary embodiment of the invention is denoted as a whole by the reference numeral 10.

The cylindrical sidewalls of a bailer are denoted 12. These sidewalls typically extend several feet in length, depending upon the application, and define the hollow interior of the bailer which receives the liquid fluid as it flows upwardly past a ball valve means and which contains the collected fluid when the ball valve is seated on its valve seat. It should be understood that only the lowermost end of a bailer is depicted.

Tapered sidewalls 14 have a frusto-conical configuration. They extend from the lowermost end of cylindrical sidewalls 12 to the uppermost end of truncate cylindrical sidewalls 16 that form a downspout means at the lowermost end of the bailer. These tapered sidewalls 14 are provided in industry standard bailers. In the bailers of the prior art, an annular step, not shown, is formed on interior surface 18 thereof about mid-length of sidewalls 14 and serves as the valve seat for a free-floating ball, not shown, when the bailer is lifted from a body of liquid fluid being sampled.

Figure 2:
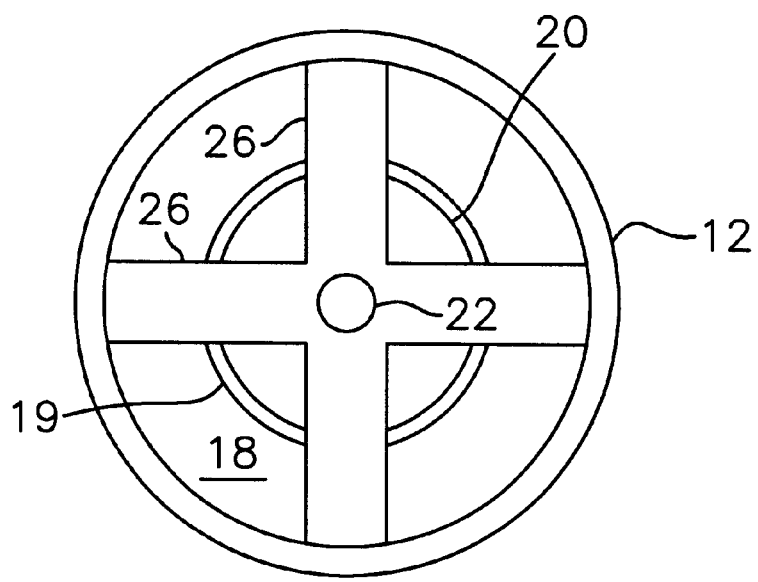
FIG. 2 is a bottom plan view of said first embodiment.

In the first embodiment, a hemispherical ball 20 is mounted at the lowermost end of a straight stem 22. Stem 22 is slideably received within a bore 24 formed in a support means that may take the form of spider 26 which spans the hollow interior of the bailer at the lowermost end of cylindrical sidewalls 12, as perhaps best understood in connection with FIG. 2. Spider 26 could have any number of radiating legs, and the invention is not limited to a spider having four legs as depicted. Spider 26 is not an integral part of the bailer; it is inserted into position when the bailer is assembled.

Stem 22 slides up and down within bore 24 as liquid fluid flows into and out of the hollow interior of the bailer, respectively, as indicated by double-headed directional arrow 23 in FIG. 1. Hemispherical ball 20 thus rises and falls as well, guided by the stem and spider support assembly.

Bore 24 is formed in the center of spider 26, and the center or axis of symmetry of said bore 24 is substantially coincident with the longitudinal axis of symmetry of the bailer.

A valve seat in the form of an annular concavity 21 is formed in the lowermost end of the interior surface 18 of tapered sidewalls 14. Its curvature matches the curvature of the exterior surface of hemispherical ball 20 so that a substantially perfect seal is formed when ball 20 is seated thereagainst.

However, sand or the like may prevent such perfect seating. Accordingly, this invention includes a layer of cushioned material 19 that overlies hemispherical ball 20. Cushioned material 19 is of predetermined uniform thickness which may vary from application to application in accordance with the requirements of the various applications.

Cushioned material 19 is preferably formed of rubber, synthetic rubber, a soft, flexible and resilient plastic, or equivalent material.

Annular concavity 21 is sized and configured to match the contour of cushioned material 19. However, any manufacturing imperfections are in effect forgiven by the cushioned material because said cushioned material conforms to the shape of said annular concavity even if said annular concavity is out-of-round or otherwise imperfectly formed.

Figure 3:
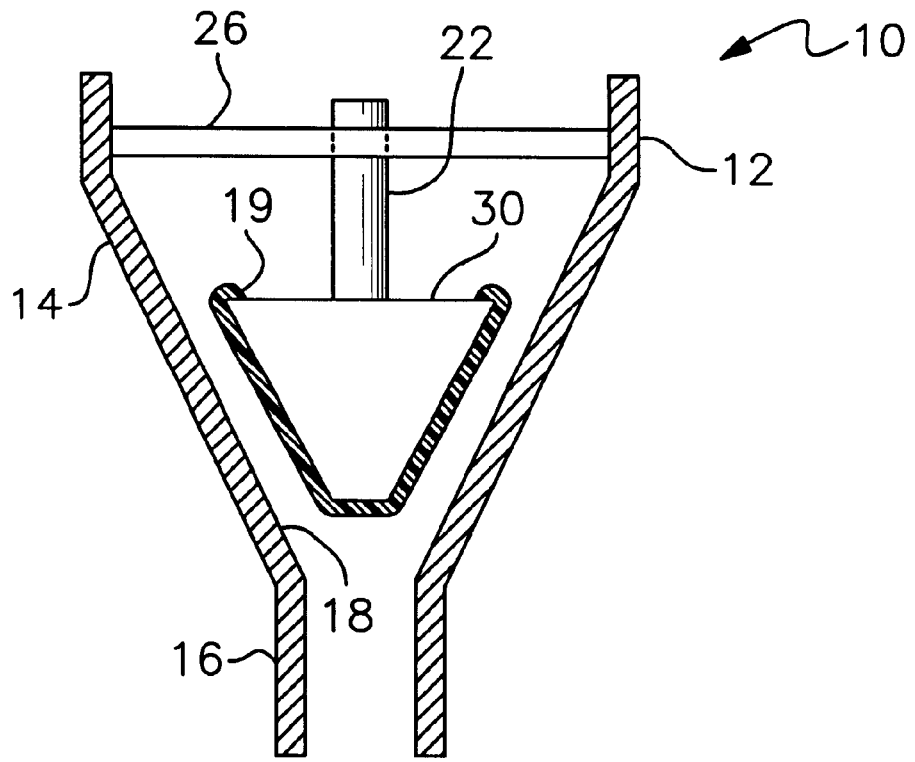
FIG. 3 is a side elevational, sectional view of a second embodiment of an improved valve means for a bailer.
Figure 4:
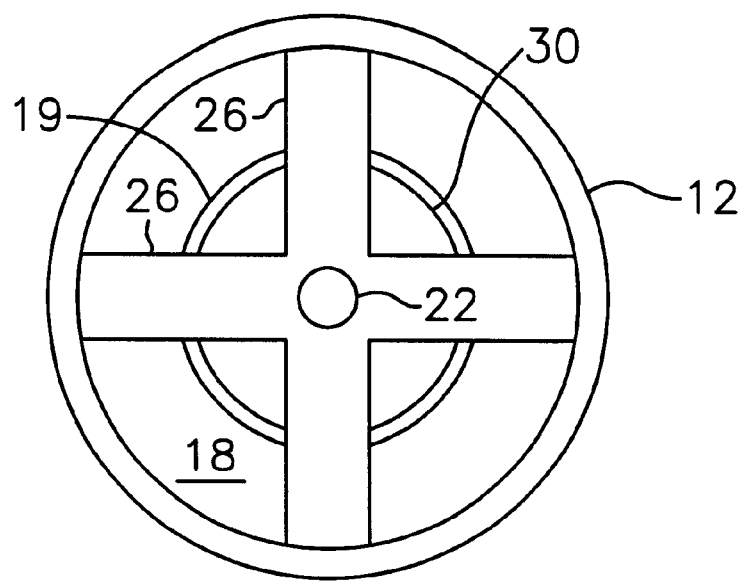
FIG. 4 is a bottom plan view of said second embodiment.

FIGS. 3 and 4 depict a second embodiment of the invention. In the embodiment of FIGS. 3 and 4, frusto-conical valve body 30 seats against the flat interior surface of the valve seat provided by frusto-conical sidewalls 18 when liquid fluid flows out of the bailer, there being no concavity formed in said flat sidewalls. Downspout 16 is cylindrical as in the first embodiment. Cushioned material 19 overlies valve body 30 and conforms to its shape and that of the valve seat. Again, however, the cushioned material conforms to the size and shape of a wide range of valve bodies and valve seats, thereby forgiving deviations from manufacturing tolerances for said parts.

Figure 5:
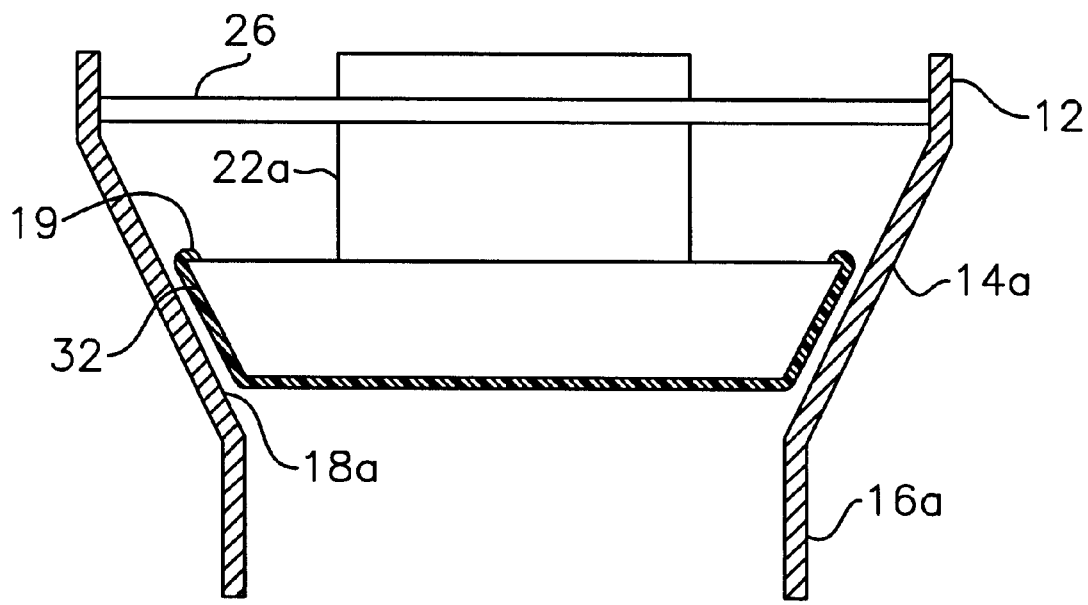
FIG. 5 is a side elevational, sectional view of a third embodiment of an improved valve means for a bailer.
Figure 6:
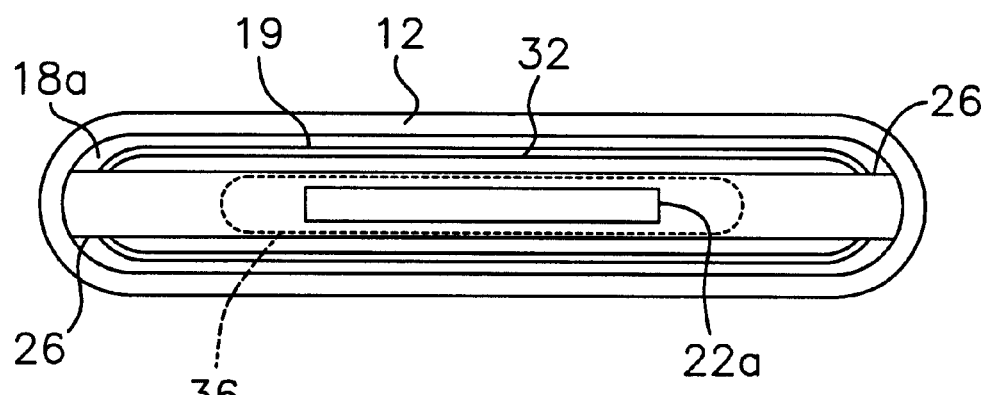
FIG. 6 is a bottom plan view of said third embodiment.

FIGS. 5 and 6 depict a third embodiment of the invention. In the embodiment of FIGS. 5 and 6, valve body 32 is not frusto-conical nor are downwardly-tapered sidewalls 14a and 18a which form the valve seat. Instead, sidewalls 14a and 18a taper downwardly to form an elongate, narrow open slot 36 as depicted in FIG. 6. Valve body 32 is complementally formed so that it seats squarely against downwardly-tapered sidewalls 18a when the bailer is lifted from the liquid fluid being sampled. Note that stem 22a is also narrow and elongated in this embodiment, as is downspout 16a. Valve body 32 is covered by cushioned material 19 that has a uniform thickness so that it conforms to the shape of said valve body and hence to the shape of the valve seat, even if said respective shapes are outside of manufacturing tolerances.

Figure 7:
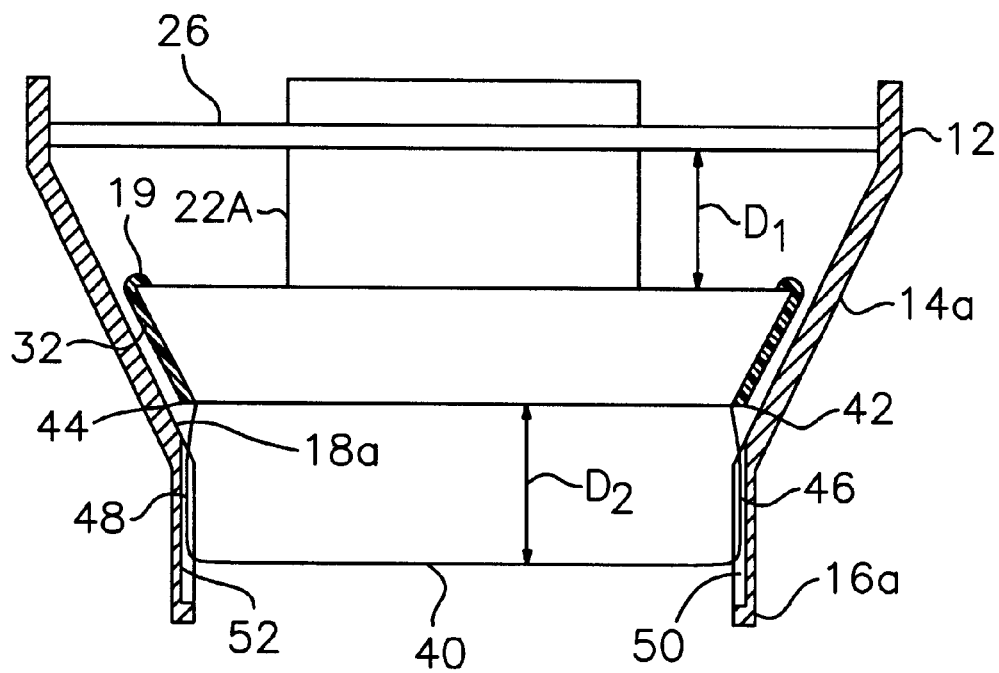
FIG. 7 is a side elevational, sectional view of a fourth embodiment of an improved means for said bailer.
Figure 8:
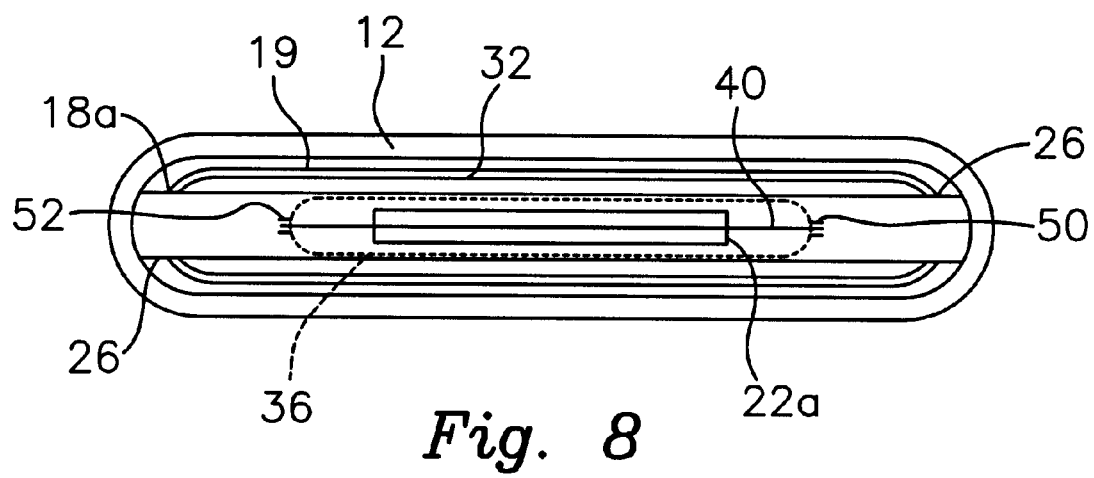
FIG. 8 is a bottom plan view of said fourth embodiment.

FIGS. 7 and 8 depict a fourth embodiment having substantially the same structure as the third embodiment but adding a means to ensure that elongate, narrow valve body 32 seats properly against downwardly-tapered sidewalls 18a that form the valve seat.

A flexible and resilient plastic guide means 40 of thin construction depends from valve body 32. More particularly, guide means 40 is attached at its opposite ends 42, 44 to opposite ends of valve body 32 at its bottom. A convex radius 46, 48 is formed in the laterally opposed sides of guide 40. A vertically extending groove 50, 52 is formed in diametrically opposite sides of the internal surface of downspout 16a to respectively and slidingly receive the opposite sides of guide means 40. Distance D1 from spider support member 26 to the top of valve body 32 and distance D2 from the bottom of said valve body 32 to the center of grooves 50, 52 are substantially equal to one another. In this way, opposite ends 42, 44 of guide means 40 are respectively received within grooves 50, 52 even when elongate, narrow valve body 32 is in its uppermost or fully raised position. Cushioned material 19 of uniform thickness covers valve body 32.

In addition to providing a means whereby the annular groove of the related application is eliminated, the flexible and resilient cushioning means of this invention enables a relaxation of manufacturing tolerance requirements for the formation of the valve body and the valve seat because the valve body need not conform perfectly to the valve seat as in the embodiments disclosed in the related application. The cushioned cover for the valve body allows both the valve body and the valve seat to vary somewhat from tight manufacturing tolerance requirements because the cushioned cover fits a wide range of valve bodies and seats and seals effectively against a wide range of valve seats. The resilient, flexible, cushioned cover conforms to the shape of an out-of-round valve seat just as effectively as it conforms to the shape of a perfectly formed valve seat.

This invention represents a major breakthrough in the art of bailers. Being drawn to a pioneering invention, the claims that follow are entitled, as a matter of law, to broad interpretation to protect the heart or essence of the invention from piracy.

It will thus be seen that the objects set forth above, and those made apparent from the foregoing description, are efficiently attained. Since certain changes may be made in the foregoing construction without departing from the scope of the invention, it is intended that all matters contained in the foregoing construction or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A valve assembly for admitting liquid fluid into the hollow interior of a bailer as liquid fluid flows into said bailer and for retaining liquid fluid within said hollow interior when said liquid fluid is not flowing into said bailer, comprising:

a support means that spans a hollow interior of said bailer;

a central bore formed in said support means, said central bore having an axis of symmetry that is substantially coincident with a longitudinal axis of symmetry of said bailer;

said bailer including frusto-conical sidewalls at a lower end thereof;

a valve stem slideably mounted in said central bore;

a hemispherical valve body secured to a lowermost end of said valve stem;

said hemispherical valve body rising as liquid fluid flows into said hollow interior of said bailer, and said hemispherical valve body sinking when liquid fluid is not flowing into said bailer, said valve stem and said central bore cooperating to maintain said hemispherical valve body in substantial coincidence with said longitudinal axis of symmetry of said bailer as said hemispherical valve body rises and sinks;

a layer of cushioned material of predetermined thickness disposed in overlying relation to substantially all of said hemispherical valve body;

an annular concavity formed in an interior surface of said frusto-conical sidewalls, said annular concavity having a contour that conforms to substantially all of the curved surface of said hemispherical valve body to provide a valve seat for said hemispherical valve body that abuttingly engages substantially all of the surface area of said cushioned material when said hemispherical valve body is seated in said valve seat so that substantially no leakage of liquid fluid from said hollow interior of said bailer occurs when said hemispherical valve body is seated against said annular concavity;

particulate matter deposited between said hemispherical valve body and said valve seat adapted to form a depression in said cushioned material when said hemispherical valve body is seated in said valve seat;

said cushioned material adapted to seal around the peripheral edge of said depression to prevent flow of liquid fluid past said cushioned material; and said cushioned material providing a seal between said hemispherical valve body and said valve seat even if said hemispherical valve body and said valve seat do not perfectly conform to one another in size and shape.

2. The valve assembly of claim 1, wherein said support means is provided in the form of a spider means having legs that radiate from a longitudinal axis of said bailer.

* * * * *